Patented Feb. 26, 1929.

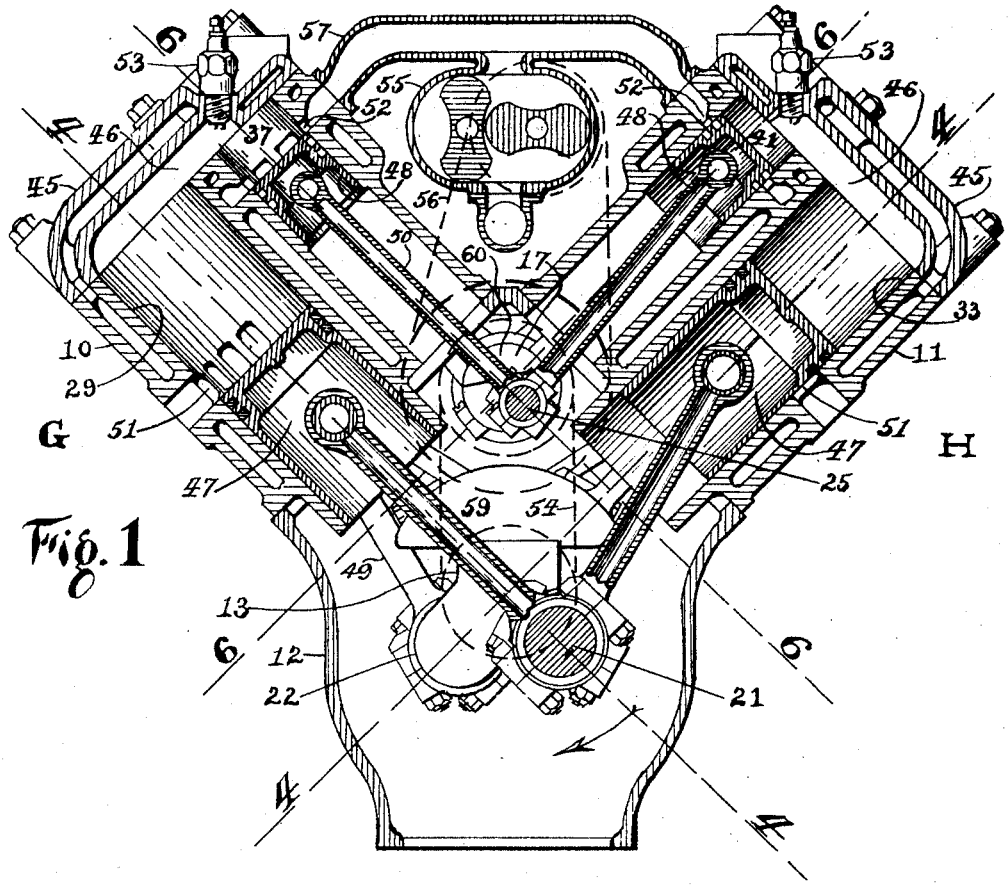
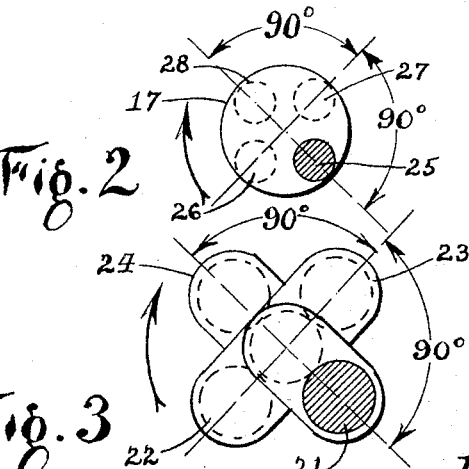

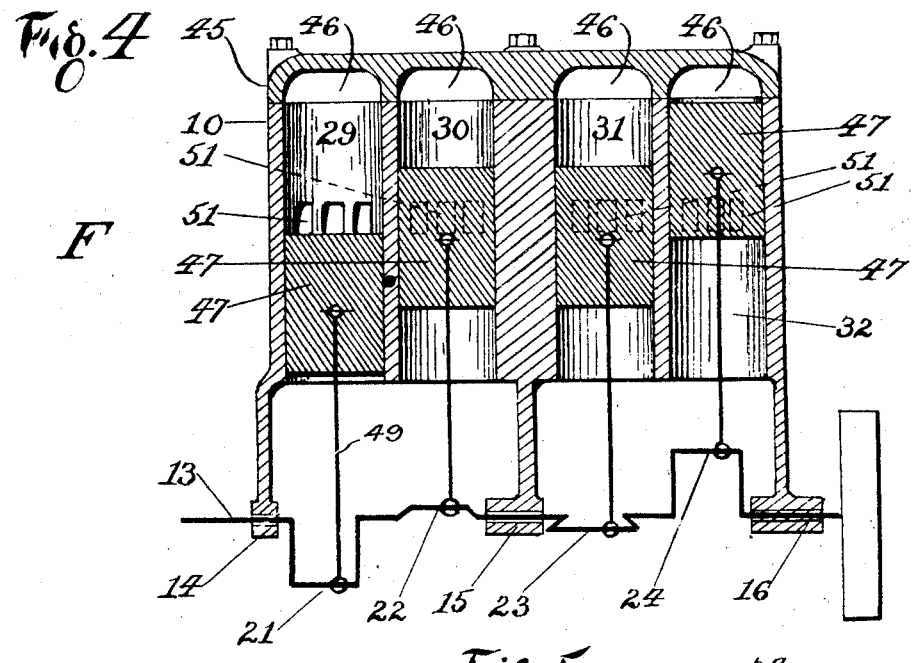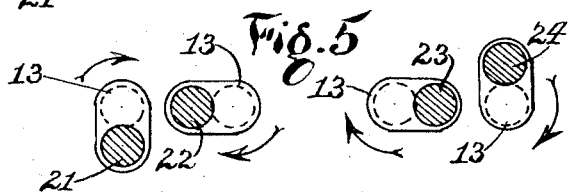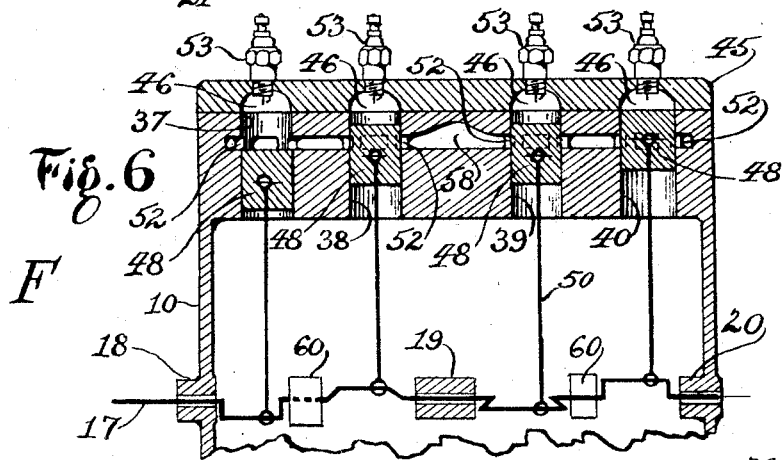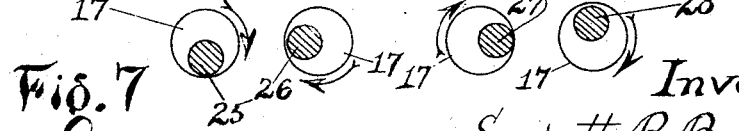

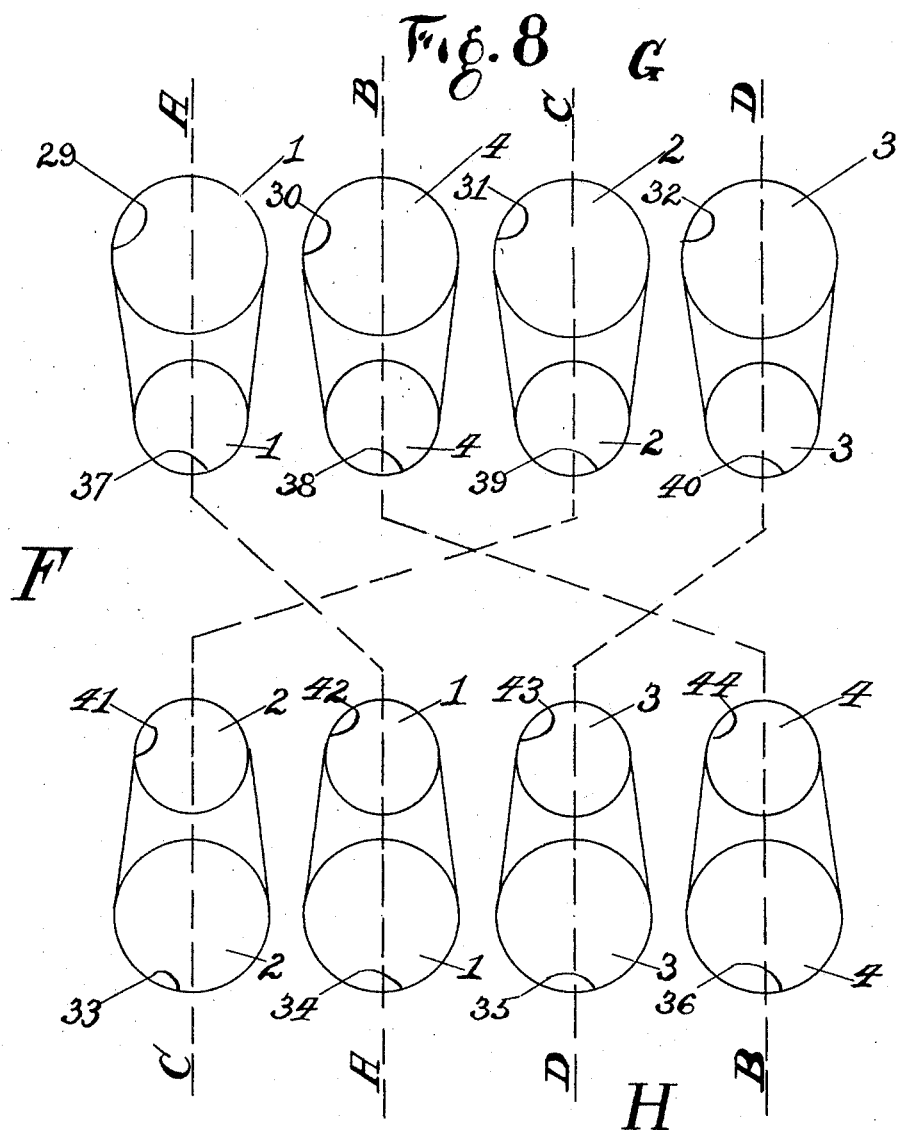

1,703,096

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION OF NEVADA.

INTERNAL-COMBUSTION ENGINE.

Application filed March 17, 1927. Serial No. 176,056.

My invention relates to internal combustion engines of the multi-cylinder type, and particularly to the dual cylinder combustion chamber, two stroke cycle type.

The principal object of my invention is, to provide a multi-cylinder two stroke cycle internal combustion engine of sixteen cylinders disposed in two 90° V banks, with pistons arranged in combination with two crank shafts, the cranks of each crank shaft, being rotatively disposed relatively, with one crank of each crank shaft comprising each of four rotatively synchronized pairs of cranks respectively arranged in common rotative planes. This specific arrangement produces two V disposed combinations of reciprocatory parts, each of the latter being respectively productive of reciprocatory forces simultaneously, by the synchronous actuation of pairs of respective parts within each of the two banks of the V-structure relatively in units that are longitudinally remotely located with respect to the axes of the two crank shafts of the engine. Thus, resultant forces are produced in separate planes relatively located, whereby, complete compensation of the reciprocatory forces may be effected in the respective planes wherein the said forces are produced by centrifugal force provided by counter balance weights fixed on the crank shafts.

Further objects of my invention are, to provide a two stroke cycle internal combustion engine made up of eight dual combustion chambers, each of which eight dual combustion chambers comprises two cylinders, the aggregate of sixteen cylinders thereof being disposed in four rows with four cylinders arranged in each of the four rows, the four cylinders of each of the four rows being arranged in line, the four rows of cylinders being arranged in two banks, each bank comprising two rows of cylinders, the cylinders of each of the two banks being axially parallel, and relatively arranged in transversely disposed pairs. The chambers of each adjacent transversely arranged pair of cylinders are connected at their head ends by common compression clearance chambers. The two banks of cylinders are angularly disposed to form a V-construction, whereby the axes of the cylinders of one row of one bank, are relatively of 90° divergence with the axes of the respective cylinders of one row of the other of the two banks, and all of the cylinders having axes intersecting at the two common centers. The axial planes of one row of cylinders of each of the two V disposed banks diverge respectively at 90° angle to one of two common centers. Sixteen pistons are provided, one piston arranged for reciprocatory movement within each cylinder. Two crank shafts are provided, each crank shaft having four cranks arranged in two planes, with the end cranks of each shaft diametrically or oppositely disposed, the center cranks of each shaft being diametrically or oppositely disposed and the first and second cranks respectively from each end of each of the two crank shafts being relatively disposed rotatively 90° apart. Means connect the two crank shafts to effect a one to one rotative actuation of the two shafts of a timing relation, whereof, the respective cranks of each of the two crank shafts will be rotatively synchronized relatively with respect to their rotary movement across the cylinder axial planes, respectively, of head or crank centers, relatively thereof. Eight pistons are connected to each crank shaft, the pistons connected with a given crank shaft, being pistons respectively of four cylinders of each of the two banks, which cylinders are arranged relatively angularly diverging to a given one of the two common centers, there being two pistons connected to each crank of each crank shaft, the said two pistons connected to any one of the given cranks, being a pair of pistons relatively arranged in 90° V disposed cylinders, respectively of a given transverse plane.

The specific construction and arrangement of parts, in combination as set forth in this specification, form the embodiment of my invention and provide an improved all combustion chamber multi-cylinder V-type internal combustion engine, made up of a multiplicity of two operating V-type combinations, each having a multiplicity of respective parts that provide relative periodicity of force development, in direction, and relative force weight, compatible with a method of compensating a plurality of angularly disposed reciprocatory forces, produced longitudinally along the axial line of a crank shaft, by centrifugal force produced by rotary weights provided on the crank shaft.

Further objects of my invention are, to provide a multi-cylinder two stroke internal combustion engine, of sixteen pistons associated with eight combustion chambers, and operatively connected with two crank shafts, with cylinders arranged in two banks of respectively parallel cylinders and four cranks formed respectively of each of the two crank shafts, thereby providing for a combined actuation of reciprocatory parts, which transmit their respective forces to the crank shafts, respectively of uniformly spaced periodicity of sequence, there being two units of power generation produced of separate cycle of events during each period of sequence. Each unit of power generation is transmitted to each of the two crank shafts simultaneously by one piston of the two pistons of each commonly joined pair of cylinders, comprising a respective combustion unit and associate connection to each of the two crank shafts simultaneously at a relative angle of 90° from each of the two relatively V disposed units of the multi-cylinder construction. A reciprocatory force of a given weight and direction is transmitted respectively to the two crank shafts simultaneously along the axis of the respective crank shafts, of units situated longitudinally, angularly and transversely, of relative positions, whereby the reciprocatory forces produced are of a combination, so disposed that the respective forces are mechanically compensated, and all resultants respectively of a nature inherently productive of unbalanced forces, normally productive of vibration, are eliminated.

A further object of my invention is to provide an internal combustion engine developing cycles of events productive of eight combustion events in eight combustion chambers, the forces of which, are produced and transmitted to two crank shafts in four uniformly spaced periodicities, each period involving a sequence of two simultaneously produced power impulses effected by two pairs of synchronously actuated reciprocatory parts relatively disposed with the axes of the two crank shafts, respectively of 90° angularity.

A further object of my invention is to provide an internal combustion engine made up of a multiplicity of moving parts and a plurality of combustion cylinders operatively related in time of respective parts movement in unison, whereby the various events of function necessary to accomplish two stroke cycle operation, in each of an even plurality of units, are produced in a dual manner, simultaneously in V-disposed pairs of commonly connected axially parallel dual cylinder combustion chambers.

A further object of my invention is to provide an internal combustion engine, in which four periods of power impulse are produced and transmitted to two associated crank shafts, the combination and arrangement of parts forming the spirit of my invention, providing the operation of the engine in an improved form, whereby each power sequence is produced of two equally divided volumes of gaseous quantity confined in chambers of relatively angularly disposed cylinders, relatively of remote position, with respect to the general construction, facilitating the balancing of torque stress on the structure, heat convection, modification of the force of the respective bodies of combustion and providing smooth and efficient power development and transmission.

The aforesaid arrangement permitting a very great increase in periodicity of functions per given time without overheating and the subsequent minimization of stress of reciprocative and rotary parts comparatively with conventional larger single function units, providing an engine of very great power output, capable of sustained high rotative speed and light in weight.

The occurrence of power generation, subsequent piston thrust on the cylinder walls and the angular divergence by which the power is transmitted to the crank shaft from two reciprocatory units relatively disposed in substantial V arrangement simultaneously provides an improved transmission of power, reducing the magnitude of the force acting at right angles to the axes of the cylinders in a given plane and the transmission of a given power to two points of the crank shaft construction instead of one, minimizing the distortion and reaction.

In a two stroke cycle internal combustion engine it is particularly important to minimize the volumes of heat since the periodicity of heat generation within a given wall area is twice that of the four stroke cycle engine of a given rotative speed.

In the construction as described herein and forming the embodiment of my invention, reciprocatory forces, both primary and secondary can be counter balanced to the point vanishing the out of balance forces and the rotary masses may also be perfectly balanced in good practice.

Obviously an engine constructed and operated in the manner set forth, in accordance with the arrangement and combination of parts forming the embodiment of my present invention, will provide a very great improvement in two-stroke cycle engines permitting sustained high speed and very great power output from an engine of a given weight and size with relatively smoother operation correspondingly with conventional two-stroke or four-stroke cycle engines of the V type construction wherein each power impulse of a given power is confined to one unit.

A further object of my invention is to provide an engine of positive and silent operation, the inlet valve means being constructed of a multiple of small pistons arranged relatively in reciprocatory movement which will permit the counter balancing of the forces developed of the inertia of these respective parts, also the small pistons providing effective stroke sweep compression and expansion providing additional power transmission as additional engine displacement to the main power pistons.

With the foregoing and other objects in view, my invention consists in certain novel features of construction and arrangement of parts that will hereinafter be more fully described and claimed and illustrated in the accompanying drawing, in which—

Fig. 1 is a vertical section taken transversely of the engine through the center of a pair of relatively V-formed cylinder constructions of angular divergence of 90°, the section through either of the remaining three relatively V-formed pairs of cylinder constructions being of like construction.

Fig. 2 is a diagrammatic view graphically illustrating the relative position of the four cranks of the auxiliary crank shaft associated with the inlet valves.

Fig. 3 is a diagrammatic view graphically illustrating the relative position of the four cranks of the main crank shaft.

Fig. 4 is a longitudinal section taken on line 4—4 of Fig. 1 through the center of one row of four main cylinders comprising one of the two V-arranged rows of main cylinders, each of the two V-disposed rows of cylinders being of like construction.

Fig. 5 is a diagrammatic view graphically illustrating the respective position of the four cranks of the main crank shaft individually drawn in the plane of each crank.

Fig. 6 is a longitudinal section taken on line 6—6 of Fig. 1, the cutting edge being taken through the center of one row of piston valve cylinders adapted to inlet function, the construction of each of the relatively V-disposed in line cylinder constructions being alike.

Fig. 7 is a diagrammatic view graphically illustrating the relative positions of the four cranks of the auxiliary crank shaft individually drawn in the plane of each crank.

Fig. 8 is a plan diagrammatic view of the two line constructions of cylinders comprising the two V-disposed groups of cylinders, with stepped lines extending transversely of the engine, the respective lines intersecting the cylinders of the given units of each V-construction, the pistons of which pairs of units are of simultaneous stroke movement and in which units synchronous function is accomplished.

The rotary direction of the cranks are indicated by arrows in Figures 2, 3, 5 and 7, clockwise from the end F.

Referring by numerals to the accompanying drawings, which illustrate a practical embodiment of my invention, 10 and 11 are respectively group constructions of cylinders, the said cylinders surmount a crank case 12.

A main crank shaft 13 is suitably journalled within the crank case 12 in main bearings 14, 15 and 16. An auxiliary crank shaft 17 is arranged in the crank case with axis parallel with the axis of the main crank shaft, the auxiliary crank shaft 17 is journaled in main bearings 18, 19 and 20.

Four cranks 21, 22, 23 and 24 are formed of the main crank shaft 13 and four cranks 25, 26, 27 and 28 are formed of the auxiliary crank shaft 17.

The relative position of the four cranks with respect to either of the two crank shafts are of the following relative arrangement: The two end cranks are arranged relatively 180° apart, the two center cranks are relatively 180° apart, the two center cranks occupying a plane at right angle to the plane occupied by the two end cranks and the relative position of the two center cranks right or left relatively with respect to the end crank of either end of the crank shaft considering the circular line of the cranks rotative track clockwise or anti-clockwise, the second crank from a given end may be on either side.

It is necessary however that the given cranks from a given end of the two crank shafts be of like position relatively of four crank formation, in order that the stroke movement of the associated reciprocatory parts to a given crank from a given end of the two shafts be of stroke movement substantially simultaneous in direction. The invention being characterized in part by this feature.

Eight main combustion cylinders 29, 30, 31, 32, 33, 34, 35 and 36 are formed in the two V-disposed constructions and eight auxiliary cylinders 37, 38, 39, 40, 41, 42, 43 and 44 are formed in the two V-disposed constructions.

The eight main cylinders are formed in two rows, four main cylinders in each row, the line of each row being parallel with the axis of the main crank shaft and the axis of the main cylinders embodying one row of four cylinders being relatively of substantially 90° angular divergence with respect to the axes of the four cylinders embodying the other row of four main cylinders, with the axes of the main cylinders of each of the two rows intersecting the axes of the main crank shaft.

The eight auxiliary cylinders are formed in two rows, four auxiliary cylinders in each row, the line of each row being parallel with the axis of the auxiliary crank shaft and the axes of the auxiliary cylinders embodying one row being relatively of substantially 90° divergence with respect to the axes of the four cylinders embodying the other row of auxiliary cylinders, with the axes of the auxiliary cylinders of the two rows intersecting the axis of the auxiliary crank shaft. The two rows of auxiliary cylinders being constructed as an inside V-formation of eight cylinders within the V-formation of main cylinders.

Longitudinally with respect to the engine the cylinders of the four rows of cylinders are relatively arranged in four transverse planes substantially radially in line forming four transverse radial rows of cylinders. Thus forming an adjacent construction of one main cylinder and one auxiliary cylinder in a given transverse plane in each of the V-disposed cylinder constructions.

A cylinder head 45, preferably detachable, is formed as a head end enclosure to the cylinders of each group, recesses 46 are formed in the cylinder head 45. Each recess 46 thus provided forms a common compression clearance for one main cylinder and one auxiliary cylinder, associating the chambers of the said two cylinders as one common chamber, the two cylinders being joined by any one of these recesses being one main and one auxiliary cylinder of one and the same V-formed construction and of a given transverse plane. The agroupment of all the cylinders thereby provides an engine of eight commonly joined transversely arranged pairs. Eight main pistons 47 are arranged for reciprocatory movement, one piston within each of the eight V-disposed main cylinders.

Eight auxiliary pistons 48 are arranged for reciprocatory movement, one piston within each of the eight auxiliary cylinders.

Separate connections 49 are provided between each of the eight main pistons 47 and the main crank shaft 13 and separate connections 50 are provided between each of the eight auxiliary pistons 48 and the auxiliary crank shaft 17. One piston of a kind, main or auxiliary, of each V-disposed construction is connected to each one of the four cranks of the crank shaft to which the respective constructive is in association and each given two pistons connected to a given crank being the pistons of the cylinders occupying a given transverse plane.

Exhaust ports 51 are formed through the wall of each of the eight main cylinders and inlet ports 52 are formed through the wall of each of the auxiliary cylinders, the exhaust and inlet ports respectively being located in the respective cylinders at a point relatively with the stroke movement of the pistons arranged for reciprocatory movement, within the respective cylinders, which will provide the full opening of the respective ports wholly to the chamber headward of the pistons only when the respective piston of a given cylinder is in the position of crank end dead center.

An ignition device 53 is secured in the cylinders heads 45, with sparking electrodes extending into the chamber within the recesses 46, preferably at a point directly over the auxiliary cylinder, in which cylinder of each commonly joined pair of cylinders the inlet ports 52 are formed.

A driving timing means 54 is provided between the main and auxiliary crank shafts, providing one to one ratio of rotation between the two shafts.

A fresh charge induction compressor 55 is shown arranged between the V-disposed cylinder constructions. This device is adapted to provide forced induction of fresh gaseous mixture to the chambers of all the cylinders. The design of this device does not enter into the spirit of the invention. Any suitable means of providing the necessary function of fresh charge induction may be adapted as an accessory as desired.

A driving means 56 is provided between the rotary construction of the engine and the operating parts of the compressor.

A discharge pipe 57 is provided extending from the outlet passage 58 formed in registration with the inlet ports 52 formed in each of the auxiliary cylinders 37, 38, 39, 40, 41, 42, 43, and 44, providing a passage communication between the compressor and each of the eight common chambers of the cylinders, the said communication being subject to cutoff by the pistons of the auxiliary cylinders.

The cooling of the engine may be of either fluid or air as may be desired.

Counter weights 59 are arranged to the main crank shaft and designed in counter weight to equal the forces of reciprocatory and rotary parts transmitted to the cranks of the main shaft, also counter weights 60 may be arranged to the auxiliary shaft in a like manner of the same principle of counter balancing as is employed in conventional four cycle engines of V-cylinder construction in which engines four relatively 90° spaced cranks are formed of the crank shaft and arranged in two planes.

The operation of my improved engine is as follows:

Assuming the parts to be in the relative positions as illustrated in the accompanying drawings, the V-disposed parts as illustrated by Fig. 1 considered as the parts of one V-arranged pair of cylinder constructions occupying a given transverse plane and assumed to be the first V-pair from a given end of the engine indicated by F of Fig. 4, F of Fig. 6 and F of Fig. 8, the transverse plane being indicated by A of Fig. 8.

The parts rotation of the main shaft 13 and the rotation of the auxiliary crankshaft 17 being given as clockwise in direction viewed from the end designated as F of the respective figures and referred to hereinafter as the front end of the engine.

The corresponding position of the respective parts of each of the remaining three V-arranged pairs of cylinder constructions will be relatively with respect to the parts of the front end V-pair as illustrated by Fig. 1 of main crank positions as illustrated by Fig. 5, of auxiliary crank positions as illustrated by Fig. 7, of main and auxiliary piston positions in the in line cylinder construction taken to the left side from the end F, and designated by G, the end pistons being respectively, one main and one auxiliary piston at head end dead center, the other end one main and one auxiliary piston being at crank end dead center, the center main and auxiliary pistons being in pairs transversely alike in half stroke positions, the stroke direction corresponding to the respective associated crank positions rotatively as indicated by arrows of Fig. 5 and Fig. 7.

The relative positions of the main and auxiliary pistons of the in line cylinder construction comprising the parts of the other of the two V-disposed cylinder construction being indicated by H of Fig. 1 being the construction to the right side from the front end designated F of Fig. 8, with respect to the two relatively adjacent transverse end pairs of main and auxiliary pistons and the two relatively adjacent center pairs of main and auxiliary pistons being respectively end and center of opposite position as are the positions of the pistons as illustrated by Fig. 4 and Fig. 6 owing to the 90° V-disposition of the two in line constructions of cylinders. Thus in order as designated numerically, for example: 1, 2, 3 and 4 and illustrated by like numerals in such manner on Fig. 8, four pistons, two main and two auxiliary pistons, being one main piston and one auxiliary piston of each of the two V-arranged constructions of cylinders will reach a given point in each cycle of two stroke movement, head end to crank end and return, simultaneously at one time. The pistons of the cylinders axially intersected by the respective lines A—A, B—B, C—C and D—D will be respectively of synchronous reciprocatory movement.

The relative reciprocatory movement of the pistons of the cylinders intersected by the said lines being relatively correspondingly of movement in order as indicated by 1, 2, 3 and 4 corresponding to the 90° spacing of the four cranks of the main and four cranks of the auxiliary crank shafts.

Obviously the firing order every revolution of the crank shaft will be as indicated: 1, 2, 3, and 4, shown by like numerals on Fig. 8, combustion occurring simultaneously within two combustion chambers and since there is one main and one auxiliary piston associated with each combustion chamber, combustion will be effective in power development by the expansion resultant of the stroke sweep displacement of four pistons synchronously in stroke movement in unison, with four synchronously moving groups of four pistons to each group equally spaced apart in stroke movement, providing four power impulses to each one revolution of the crank shafts.

The gaseous flow through any one of the eight combustion chambers, the compression and combustion function is accomplished in each unit as follows:

Taking the unit as illustrated in Fig. 1 of G line, the pistons and cranks being at this moment in the position of crank end dead center. The exhaust ports 51 and the inlet ports 52 being open, the impellers of the compressor 55 being in an operating position developing an impulse to gaseous discharge flow, the gaseous mixture being inducted into the common chamber of the main and auxiliary cylinders of the respective unit, through the inlet ports 52, causing scavenging by uniflow of the residual gases through the exhaust ports 51.

The movement of the pistons of the two cylinders of a given unit headwardly, from the position of crank end dead center, providing a cut off of both the exhaust and inlet ports, compression following within the common chamber 46.

At the time the pistons of the given unit are in a position substantially head end dead center, ignition is provided by the spark plug 53, combustion following, forcing the two pistons of a given unit crankwardly through the respective cylinders and incurring the transmission of power to the crank shaft.

The two pistons of the cylinders of a given unit approaching crank end dead center will uncover the exhaust ports and inlet ports of the respective cylinders, providing exhaust and inlet port registration with the combustion chamber and the scavenging and fresh gaseous induction function again taking place.

The same relative series of functions taking place in each of the commonly joined pairs of cylinders.

It will be understood that minor changes in the size, form and construction of the various parts of my improved engine may be made and substituted for those herein described without departing from the spirit of the invention, the scope of which is set forth in the appended claims.

I claim as my invention:

1. In a two-stroke cycle internal combustion engine, a series of sixteen combustion cylinders arranged in two banks of 90° divergence, eight cylinders in each bank, each bank being arranged in two rows of four cylinders each, the cylinders in each bank being arranged in pairs with one member of each pair directly above the other, the four pairs of cylinders in one bank being disposed transversely opposite from the corresponding pair of cylinders in the opposite bank, the lower cylinder of each pair having a main combustion chamber, the upper cylinder of each pair having an auxiliary combustion chamber, the members of each pair of main and auxiliary combustion chambers being connected at their head ends by a common combustion clearance space, the main combustion chamber of each pair having an exhaust port, the auxiliary combustion chamber of each pair having a charge volume inlet port, a piston arranged for operation within each combustion chamber, and controlling the respective ports therein, a main crank shaft mounted for operation, the axis of which crank shaft intersects the axes of the eight main combustion chambers in the two lower rows of cylinders, said crank shaft having four throws that are disposed radially 90° apart, the two end throws being disposed 180° apart, the two intermediate throws being disposed 180° from each other and 90° from the two end throws, separate connections from the pistons within the transversely opposite members of each pair of main combustion chambers to the respective throw of the crank shaft, a secondary crank shaft arranged to operate synchronously with the main crank shaft, and having four throws that occupy the same relative angular and radial positions as the four throws of the main crank shaft, the axis of which auxiliary crank shaft intersects the axes of the eight auxiliary combustion chambers, connections from the pistons within the transversely opposite members of each pair of auxiliary combustion chambers, with the respective throws of the secondary crank shaft, and means for simultaneously igniting compressed gaseous fuel charges in one of the dual combustion chambers in one bank of the cylinders and in a transversely offset dual combustion chamber in the opposite bank of cylinders.

2. In a two-stroke cycle internal combustion engine, a series of sixteen combustion cylinders arranged in two banks of 90° divergence, eight cylinders in each bank, each bank being arranged in two rows of four cylinders each, the cylinders in each bank being arranged in pairs with one member of each pair directly above the other, the four pairs of cylinders in one bank being disposed transversely opposite from the corresponding pair of cylinders in the opposite bank, the lower cylinder of each pair having a main combustion chamber, the upper cylinder of each pair having an auxiliary combustion chamber, the members of each pair of main and auxiliary combustion chambers being connected at their head ends by a common combustion clearance space, the main combustion chamber of each pair having an exhaust port, the auxiliary combustion chamber of each pair having a charge volume inlet port, a piston arranged for operation within each combustion chamber, and controlling the respective ports therein a main crank shaft mounted for operation, the axis of which crank shaft intersects the axes of the eight main combustion chambers in the two lower rows of cylinders, said crank shaft having four throws that are disposed radially 90° apart, the two end throws being disposed 180° apart, the two intermediate throws being disposed 180° from each other and 90° from the two end throws, separate connections from the pistons within the transversely opposite members of each pair of main combustion chambers to the respective throw of the crank shaft, a secondary crank shaft arranged to operate synchronously with the main crank shaft, and having four throws that occupy the same relative angular and radial positions as the four throws of the main crank shaft, the axis of which auxiliary crank shaft intersects the axes of the eight auxiliary combustion chambers, connections from the pistons within the transversely opposite members of each pair of auxiliary combustion chambers, with the respective throws of the secondary crank shaft, and means for simultaneously igniting gaseous fuel charges within the dual combustion chamber at the end of one of the two banks of cylinders and one of the intermediate dual combustion chambers in the other bank of cylinders.

3. In a two-stroke cycle internal combustion engine, a series of sixteen combustion cylinders arranged in two banks of 90° divergence, eight cylinders in each bank, each bank being arranged in two rows of four cylinders each, the cylinders in each bank being arranged in pairs with one member of each pair directly above the other, the four pairs of cylinders in one bank being disposed transversely opposite from the corresponding pair of cylinders in the opposite bank, the lower cylinder of each pair having a main combustion chamber, the upper cylinder of each pair having an auxiliary combustion chamber, the members of each pair of main and auxiliary combustion chambers being connected at their head ends by a common combustion clearance space, the main combustion chamber of each pair having an exhaust port, the auxiliary combustion chamber of each pair having a charge volume inlet port, a piston arranged for operation within each combustion chamber, and controlling the respective ports therein, a main crank shaft mounted for operation, the axis of which crank shaft intersects the axes of the eight main combustion chambers in the two lower rows of cylinders, said crank shaft having four throws that are disposed radially 90° apart, the two end throws being disposed 180° apart, the two intermediate throws being disposed 180° from each other and 90° from the two end throws, separate connections from the pistons within the transversely opposite members of each pair of main combustion chambers to the respective throw of the crank shaft, a secondary crank shaft arranged to operate synchronously with the main crank shaft, and having four throws that occupy the same relative angular and radial positions as the four throws of the main crank shaft, the axis of which auxiliary crank shaft intersects the axes of the eight auxiliary combustion chambers, connections from the pistons within the transversely opposite members of each pair of auxiliary combustion chambers, with the respective throws of the secondary crank shaft, and means for sequentially igniting gaseous fuel charges within the dual combustion chambers so that four impulses are impressed on the crank shaft during each revolution thereof and each impulse being divided equally between two transversely offset dual combustion chambers in the two banks of cylinders and the respective pistons within said offset dual combustion chambers.

4. In a two stroke cycle internal combustion engine, eight dual combustion chambers arranged in two banks of 90° divergence, each bank containing four dual chambers and each chamber consisting of a main chamber and a secondary chamber, two axially parallel crank shafts arranged for synchronous rotation, each crank shaft having four throws disposed 90° apart with two of said throws arranged 180° apart, the other two throws being arranged 180° apart and 90° from the other two throws, pistons arranged for operation within the main and auxiliary chambers of the eight dual combustion chambers, connections from said pistons to the respective throws of the crank shaft, and which connections and cranks are arranged so that the ignition of gaseous fuel charges within the dual combustion chambers will develop four power impulses upon the main crank shaft during each revolution thereof, and each of said impulses being divided equally between two transversely offset dual combustion chambers in the two banks of cylinders and the pistons operating within the respective offset dual combustion chambers.

5. In a two-stroke cycle internal combustion engine, a pair of crank shafts, the axes of which are parallel, means for effecting synchronous operation of said crank shafts, each crank shaft having four throws that occupy the same relative radial positions, the end pair of throws of each crank shaft being disposed 180° apart, the intermediate throws of each shaft being disposed 180° apart and 90° from the other throws of said shaft, eight combustion chambers arranged in two banks of 90° divergence, pistons arranged for operation within said dual combustion chambers, connections from said pistons to the respective throws of the crank shaft, and means for sequentially igniting gaseous fuel charges within the dual combustion chambers whereby four power impulses are impressed on the synchronously operating crank shafts during each complete revolution thereof and each impulse being divided equally between two transversely offset dual combustion chambers in the two banks and the pistons and connections that are associated with the respective transversely offset dual combustion chambers.

6. In a two-stroke cycle internal combustion engine, a main crank shaft, an auxiliary crank shaft, means for effecting synchronous operation of said crank shafts, two banks of combustion cylinders, each bank having four dual combustion chambers, pistons arranged for operation within said dual combustion chambers, connections from said pistons to the respective throws of the respective crank shafts and which crank throws, connections, pistons and dual combustion chambers are arranged so that sequential ignition of gaseous fuel charges within the dual combustion chambers will develop and impress upon the main crank shaft four power impulses during each revolution thereof and each impulse being divided between two transversely offset dual combustion chambers in the two banks of cylinders and the pistons and connections that are associated with said transversely offset dual combustion chambers.

7. In an internal combustion engine, a unit construction consisting of a multiplicity of dual cylinder combustion chambers accommodating two groups of reciprocatory parts, relatively differentiating angularly, in stroke plane and relatively disposed in combination with two crank shafts, whereof, two pistons respectively transversely arranged in a pair, with the axes of said two crank shafts of each of said two groups of reciprocatory parts, are stroke wise sychronously actuated and four transversely arranged pairs of pistons relatively commonly arranged longitudinally of the engine with respect to the axes of said two crank shafts in each of said two groups are stroke wise relatively actuated of a relative simultaneous differential of stroke position, corresponding with 90° of said crank shafts rotation.

8. In an internal combustion engine, the combination of sixteen combustion cylinders, sixteen pistons, two crank shafts, means connecting eight pistons with one of said two crank shafts, means connecting the other eight of the sixteen pistons with the other one of said two crank shafts, means rotatably connecting said two crank shafts, means connecting the sixteen combustion cylinders in eight commonly joined pairs, four cranks of each of said two crank shafts, said cranks of each of the two crank shafts being relatively rotatively spaced 90° apart, the two crank shafts being connected rotatively relatively timing the respective cranks of said two crank shafts in synchronous rotating pairs, the sixteen cylinders being angularly disposed transversely with the axes of the crank shafts in two groups, the cylinders of said groups being centered respectively, two rows of each group having row axes in common with the axis of each of said two crank shafts and relatively longitudinally arranged two transverse angularly disposed pairs of cylinders in each of four planes respectively coincident with one crank of each of the two crank shafts, whereby synchronous reciprocatory movement is imparted to two pistons respectively of one commonly joined pair of cylinders of each of said two relatively angularly disposed groups of cylinders.

9. In an internal combustion engine, the combination, comprising four double V constructions of cylinders, four cylinders of each of said four double V constructions, two crank shafts, four cranks of each of said two crank shafts, the two crank shafts being arranged axially parallel with the respective cranks of one shaft occupying the same rotative plane as the respective cranks of the other of the two crank shafts, each of said four double V constructions of cylinders, being respectively arranged radially transversely coincident, in the rotary plane of one pair of commonly rotatively arranged cranks of the two crank shafts, sixteen pistons, one piston arranged for reciprocatory movement within each of the four cylinders of each of the four double V constructions of cylinders, means connecting two pistons of each of the four double V constructions of cylinders with one of the crank shafts, means connecting the other two pistons of each of said double V constructions of cylinders, with the other of the two crank shafts, means rotatably engaging the two crank shafts to provide synchronous rotary movement to four cranks of each of the two crank shafts respectively, in rotary plane coincident pairs of the two shafts and the arrangement of the four double V constructions of cylinders whereby, the respective four cylinders of each V construction form two 90° angular units and the cylinders of the said four double V construction form four parallel rows, each of the said four rows comprising four axially parallel cylinders.

10. In an internal combustion engine, a dual combination of 90° V disposed reciprocatory parts, operatively associated with two crank shafts having crank pins relatively commonly rotatively arranged in four synchronous revolving pairs, each of the said synchronous revolving pairs of crank pins comprising one crank pin of each of said two crank shafts, the crank pins of each of the two crank shafts being respectively rotatively spaced 90° apart, and the two crank pins comprising each of the four synchronous revolving pairs of crank pins respectively one crank pin of each of the two crank shafts being relatively longitudinally formed in a separate common rotative plane.

11. In an internal combustion engine, the combination of two engines operatively associated, said two engines being arranged within one common integral construction, each of the said two engines comprising eight cylinders, the cylinders of each of the two engines being relatively disposed in two wings, four cylinders arranged in each of two wings of each of said two engines, and the cylinders of the two wings of each of said two engines respectively, being disposed with axes relatively of 90° angular divergence.

In testimony whereof I affix my signature.

EVERETT R. BURTNETT.